(12) United States Patent
Lee et al.

(10) Patent No.: US 11,297,307 B2
(45) Date of Patent: Apr. 5, 2022

(54) APPARATUS FOR INSPECTING ALIGNMENT OF OPTICAL DEVICE

(71) Applicant: ISMEDIA CO., LTD., Anyang-si (KR)

(72) Inventors: Jisoo Lee, Suwon-si (KR); Chanyoung Park, Suwon-si (KR)

(73) Assignee: ISMEDIA CO., LTD.

(*) Notice: Subject to any disclaimer, the term of this patent is extended or adjusted under 35 U.S.C. 154(b) by 0 days.

(21) Appl. No.: 16/941,259

(22) Filed: Jul. 28, 2020

(65) Prior Publication Data

US 2021/0037235 A1 Feb. 4, 2021

(30) Foreign Application Priority Data

Jul. 31, 2019 (KR) .................. 10-2019-0093441

(51) Int. Cl.
| | |
|---|---|
| *H04N 17/00* | (2006.01) |
| *G06T 7/68* | (2017.01) |
| *G02B 7/02* | (2021.01) |
| *G02B 27/30* | (2006.01) |
| *G02B 27/62* | (2006.01) |
| *G06T 7/00* | (2017.01) |

(52) U.S. Cl.
CPC ........... *H04N 17/002* (2013.01); *G02B 7/021* (2013.01); *G02B 27/30* (2013.01); *G02B 27/62* (2013.01); *G06T 7/0004* (2013.01); *G06T 7/68* (2017.01); *G06T 2207/10152* (2013.01); *G06T 2207/30141* (2013.01)

(58) Field of Classification Search
CPC ..................................................... G02B 27/30
See application file for complete search history.

(56) References Cited

U.S. PATENT DOCUMENTS

| | | | | | |
|---|---|---|---|---|---|
| 3,782,832 | A | * | 1/1974 | Hacskaylo | ............ F41G 3/2622 356/153 |
| 2016/0245620 | A1 | * | 8/2016 | Tello | ...................... F41G 3/2644 |
| 2016/0363273 | A1 | * | 12/2016 | Piehler | ....................... F21V 5/04 |
| 2018/0036835 | A1 | * | 2/2018 | Kamigawara | .......... B23Q 3/157 |

FOREIGN PATENT DOCUMENTS

| | | |
|---|---|---|
| JP | 07-318838 A | 12/1995 |
| KR | 10-2012-0093689 A | 8/2012 |
| KR | 10-1470424 B1 | 12/2014 |
| KR | 10-2017-0022240 A | 3/2017 |

OTHER PUBLICATIONS

Winters D. Image quality testing improves as cameras advance. Photonics Spectra. Jan. 1, 2014;48(1):66-70. (Year: 2014).*
Wu Y, Dong L, Zhao Y, Liu M, Chu X, Jia W, Guo X. Imaging and image restoration of lens-combined modulated wavefront coding. Review of Scientific Instruments. Sep. 27, 2016;87(9):095106. (Year: 2016).*

* cited by examiner

*Primary Examiner* — Clifford Hilaire
(74) *Attorney, Agent, or Firm* — Saliwanchik, Lloyd & Eisenschenk

(57) ABSTRACT

The present disclosure relates to an apparatus for inspecting alignment of optical device including: an optical device comprising a housing having an optical path of the shape of a cylinder, a light source disposed inside the housing to provide an illumination light for inspection to a subject surface, and a collimating lens for converting the illumination light irradiated from the light source into a parallel light beam; and an alignment evaluator that is provided with a condensing lens for converting the parallel light beam into a focused light beam, and that is disposed in front of the optical device.

3 Claims, 7 Drawing Sheets

APPARATUS FOR INSPECTING ALIGNMENT OF OPTICAL DEVICE

CROSS-REFERENCE TO RELATED APPLICATION

This application claims priority to Korean Patent Application No. 10-2019-0093441, filed Jul. 31, 2019, which is hereby incorporated by reference in its entirety.

FIELD

The present disclosure relates to an apparatus for inspecting alignment of optical device, and more particularly, to an apparatus for inspecting alignment of optical device, that is capable of easily grasping the alignment state of an optical device used for inspecting image sensors.

BACKGROUND

Generally, a mobile phone built-in camera module is completed by mounting an image sensor on top of a Printed Circuit Board (PCB) substrate where a circuit pattern is printed, and attaching a housing having a lens on top of the image sensor, and then attaching a Flexible Printed Circuit (FPC) electrically connected with the circuit pattern of the PCB substrate.

The circuit pattern on the PCB substrate is not only electrically connected with the image sensor, but it is also connected with the aforementioned FPC, and therefore, images signals converted into electric signals through the image sensor may be transmitted to the mobile phone through the circuit pattern.

In order to produce such a camera module, a process of bonding the image sensor on the PCB substrate where the circuit pattern is printed, a process of bonding the housing on top of the image sensor, and then a process of bonding a connecting means such as FPC in order to electrically connect the PCB substrate with outside must be sequentially performed.

Meanwhile, in order to complete the camera module, an inspection process of reading for defects of the image sensor must be performed, and in order to improve the production efficiency of the camera module, it is desirable to inspect the performance of the image sensor prior to assembling the housing onto the PCB substrate.

Conventionally, an inspection apparatus using an optical device 10 such as a collimator illustrated in FIG. 1 has been used for inspecting image sensors.

Such an optical device 10 comprises a housing 11 having an optical path of the shape of a cylinder, a light source 12 disposed at one side inside the housing 11 in order to provide an illumination light to a subject surface such as an imaging surface of an image sensor S1, and a collimating lens 13 disposed at another side inside the housing 11 so as to convert the illumination light irradiated from the light source 12 into a parallel light beam, and the light source 12 is immobilized inside the housing 11 by a PCB substrate, and the collimating lens 13 is immobilized inside the housing 11 by an adhesive or a separate immobilizing means.

As the optical device 10 provides the illumination light to the image sensor S1, it is possible to analyze the images obtained in the image sensor S1 and evaluate the performance of the image sensor S1.

Here, only when a central axis of the light source 12 disposed inside the housing 11 and a central axis of the collimating lens 13 are aligned with a central axis CL of the housing, does an optical axis OA of the illumination light coincide with the central axis CL of the housing 11, and accordingly, it becomes possible to obtain the performance of the inspection using the optical device 10.

However, in cases where the collimating lens 13 is immobilized in an inclined state inside the housing 11 of the optical device 10 as shown in FIG. 2A, or the light source 12 is immobilized in an inclined state inside the housing 11 of the optical device 10 as shown in FIG. 2B, the optical axis OA of the illumination light provided from the light source 12 will not coincide with the central axis CL of the housing 11, and therefore, the reliability of the inspection apparatus will deteriorate.

In addition, as illustrated in FIG. 3, the plurality of optical devices 10, 10' disposed in front of the image sensor S1 must be installed such that each of the central axis CL of the housing 11 passes through the central point of the image sensor S1. However, even when the alignment state of the lens 12 and the collimating lens 13 of the optical device 10 is good, and therefore, the optical axis OA of the illumination light coincides with the central axis CL of the housing 11, if the housing 11 of the optical device 10' is installed with an inclination of a certain angle, the central axis CL of the housing 11 will deviate from the central point of the image sensor S1, and therefore, reliability of the inspection apparatus will deteriorate.

Especially, in the optical device 10 such as the aforementioned, the illumination light is provided in the form of a parallel light beam, and therefore, it is not possible to grasp the alignment state of the light source 12 and the collimating lens 13 that are inside. Therefore, even when installing in alignment such that the central axis CL of the housing 11 of the optical device 10 passes through the central point of the image sensor S, it is not possible to check the alignment state of the light source 12 or the collimating lens 13 inside the optical device 10, and therefore, there is a problem of difficulty in obtaining a precise inspection performance.

PRIOR ART LITERATURE

Patent Literature

Patent Literature 1. Korean Patent Registration 10-1470424 (Dec. 9, 2014)

SUMMARY

Therefore, a purpose of the present disclosure is to resolve the aforementioned problems of the prior art, that is, to provide an apparatus for inspecting alignment of optical device, that is capable of easily grasping the alignment state of an optical device used in image sensor inspections, by temporarily disposing, on a front end portion of the optical device, an alignment state display that may condense an illumination light provided from the optical device and display the condensed illumination light as an illumination light point having a dot form.

The aforementioned purpose is achieved by an apparatus of the present disclosure for inspecting alignment of optical device, including: an optical device comprising a housing having an optical path of the shape of a cylinder, a light source disposed inside the housing to provide an illumination light for inspection to a subject surface, and a collimating lens for converting the illumination light irradiated from the light source into a parallel light beam; and an alignment evaluator that is provided with a condensing lens for converting the parallel light beam into a focused light beam, and that is disposed in front of the optical device.

Here, it is desirable that the alignment evaluator includes an adaptor that is detachably assembled onto a front end portion of the housing while supporting the condensing lens.

Further, it is desirable that the optical device is provided in plural, and the alignment evaluator is disposed in front of each of the optical device, and the condensing lens of the alignment evaluator disposed in front of each of the plurality of optical devices is configured to focus on a single point.

Further, it is desirable that the subject surface consists of an imaging surface of an image sensor.

Further, it is desirable that the subject surface consists of a screen, and the alignment evaluator includes a laser irradiator that is capable of irradiating a laser light towards the screen in a direction parallel to a central axis of the housing.

Further, it is desirable that the laser irradiator is disposed to be rotatable around the central axis of the housing.

Further, it is desirable that the laser irradiator is provided in plural, and disposed to be symmetrical with respect to the central axis of the housing.

Further, it is desirable to further include an inspection camera that photographs the illumination light being reflected on the screen.

According to the present disclosure, an apparatus for inspecting alignment of optical device is provided, that is capable of easily grasping the alignment state of an optical device used in image sensor inspections, by temporarily disposing, on a front end portion of the optical device, an alignment state display that may condense an illumination light provided from the optical device and display the condensed illumination light as an illumination light point having a dot form.

DETAILED DESCRIPTION

Figure 1:
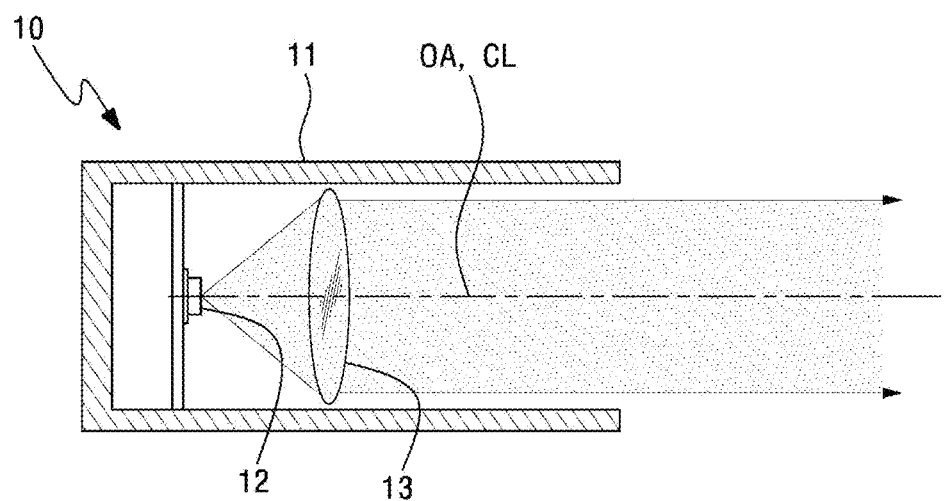
FIG. 1 is a cross-sectional view of a prior art optical device for an apparatus for inspecting alignment of optical device.
Figure 2A:
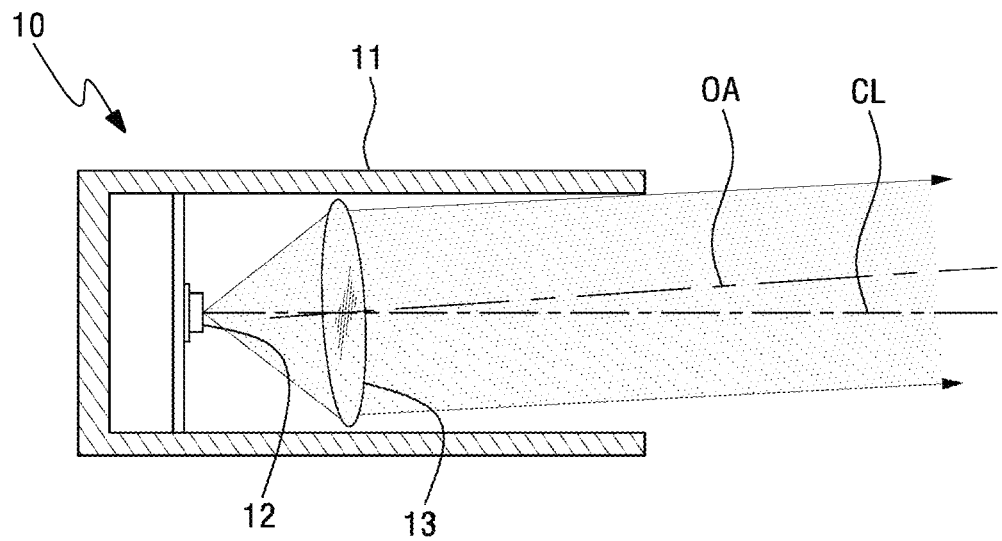
FIGS. 2A, 2B and 3 are cross-sectional views illustrating an alignment error state of the prior art optical device.
Figure 2B:
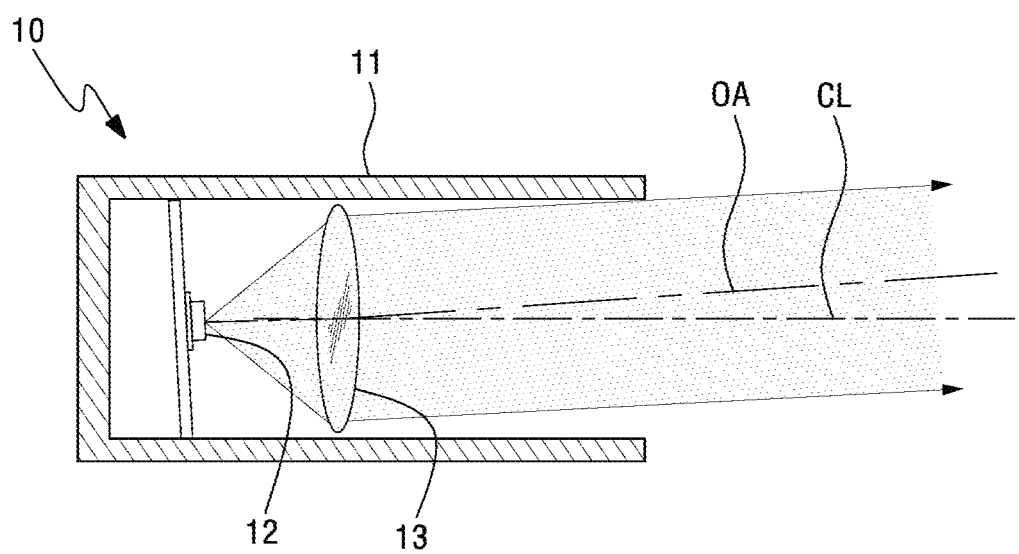
Figure 3:
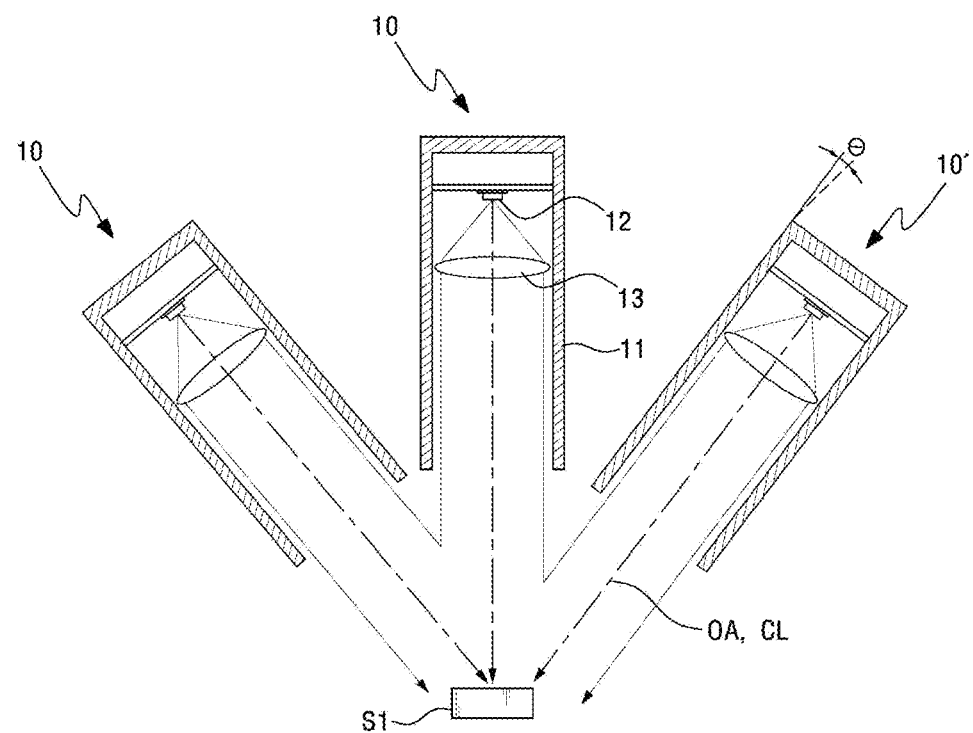

Prior to the description, it is to be noted that in various embodiments, components having the same configuration are typically described in the first embodiment using the same reference numerals, and in other embodiments, only the configurations different from the first embodiment will be described.

Hereinbelow, an apparatus for inspecting alignment of optical device according to a first embodiment of the present disclosure will be described in detail with reference to the drawings attached.

Figure 4:
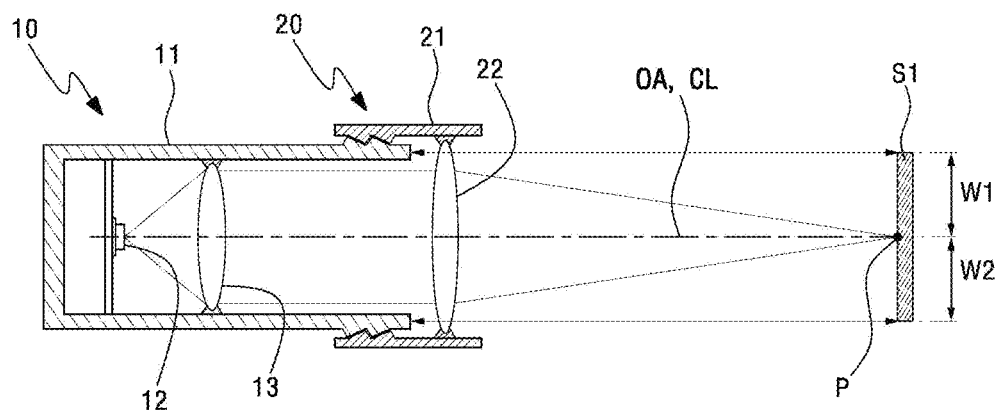
FIG. 4 is a schematic configuration view of an apparatus for inspecting alignment of optical device according to a first embodiment of the present disclosure.

Of the attached drawings, FIG. 4 is a schematic configuration view of an apparatus for inspecting alignment of optical device according to a first embodiment of the present disclosure.

The apparatus for inspecting alignment of optical device of the present disclosure as that illustrated in the drawings includes an optical device 10 disposed in front of a subject surface, and an alignment evaluator 20 detachably disposed on a front end portion facing the subject surface.

The optical device 10 includes a housing 11 having an optical path of the shape of a cylinder, a light source 12 disposed at one side inside the housing 11 in order to provide an illumination light to the subject surface such as an imaging surface of an image sensor S1, and a collimating lens 13 disposed at another side inside the housing 11 so as to convert the illumination light irradiated from the light source 12 into a parallel light beam.

Meanwhile, in the present embodiment, it was described that the optical device 10 consists of a collimator that converts an irradiated light beam into a parallel light beam, and that using this collimator, the performance of the image sensor S1 is inspected, as an example, but there is no limitation thereto.

The light source 12 may consist of at least one light emitting diode, and the light source 12 may be fixed inside the housing 11 by a printed circuit board.

The collimating lens 13 is for converting the illumination light provided by the light source 12 in the form of irradiated light beam into a parallel light beam, and the collimating lens 13 is made in the form of convex lens, and the collimating lens 13 may be fixed inside the housing 11 by an adhesive or a separate fixation means.

Meanwhile, depending on the type of inspection, between the light source 12 and the collimating lens 13, there may be disposed a diffuser (not illustrated) for diffusing the illumination light provided by the light source 12, and a translucent image chart (not illustrated) for testing where a pattern for inspection is printed.

The alignment evaluator 20 is temporarily disposed in front of the optical device 10 in order to check the alignment state of the light source 12, the collimating lens 13 and the housing 11 of the optical device 10, and the alignment evaluator 20 includes a condensing lens 22 for converting the illumination light that is a parallel light beam that passed through the collimating lens 13 of the optical device 10, into a focused light beam, and an adaptor 21 detachably assembled onto a front end portion of the housing 11 while supporting the condensing lens 22.

The condensing lens 22 may be a convex lens that may convert the illumination light which is a parallel light beam into a focused light beam, and the condensing lens 22 may be fixed inside the adaptor 21 by an adhesive or a separate fixation means.

The adapter 21 may be made in the form of a cylinder pipe, and one end of the adapter 21 may be detachably engaged to a front end of the housing 11. For this purpose, it is desirable that the housing 11 is provided with a first connecting part, and the adapter 21 is provided with a second connecting part that may be detachably assembled to the first connecting part.

In the drawings, it is illustrated as an example that the first connecting part consists of a male screw formed on an outer circumference of the front end portion of the housing 11, and the second connecting part consists of a female screw formed on an inner circumference of the adapter 21, but there is no limitation thereto, and thus various connection structures that enable detachable assembly may be used other than the screw connection method. Meanwhile, it is desirable that the central axis of the adapter 21 coincides with the central axis CL of the housing 11 when the adapter is assembled in the housing 11.

The optical device 10 may be provided in plural depending on the inspection environment or the type of image sensor S1 that is subject to the inspection, and the optical device 10 provided in plural may be disposed in a radial or symmetric form with respect to the image sensor S1 that is subject to the inspection. Further, the alignment evaluator 20 is disposed on the front end of each of the plurality of optical devices 10, and the condensing lens 22 of the alignment evaluator 20 is disposed on the front of each of the plurality of optical devices 10, and is configured to focus on a single point on the image sensor S1.

Hereinbelow, operations of the first embodiment of the apparatus for inspecting alignment of optical device mentioned above will be described.

Figure 5A:
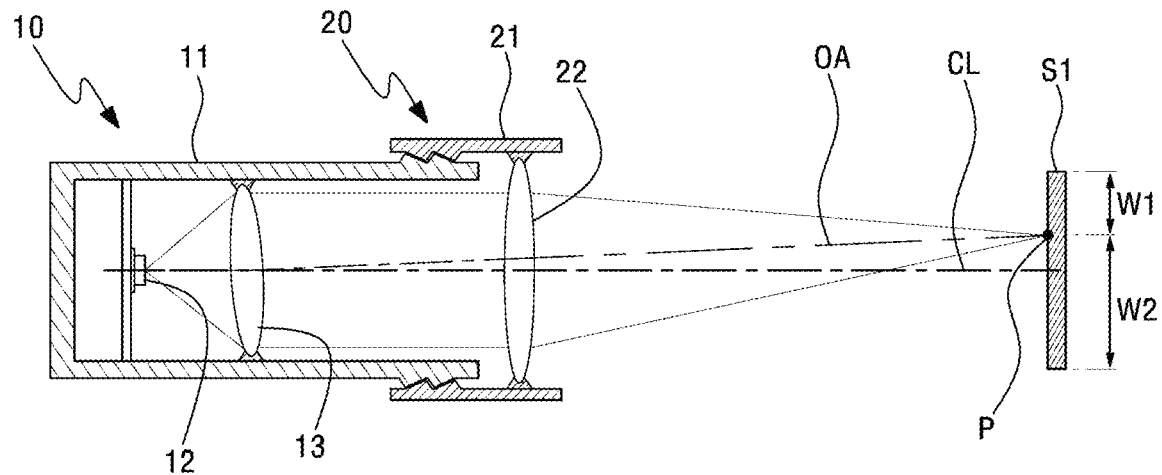
FIGS. 5A, 5B and 6 are views illustrating a state where an alignment error has been determined according to the apparatus for inspecting alignment of optical device of the present disclosure.
Figure 5B:
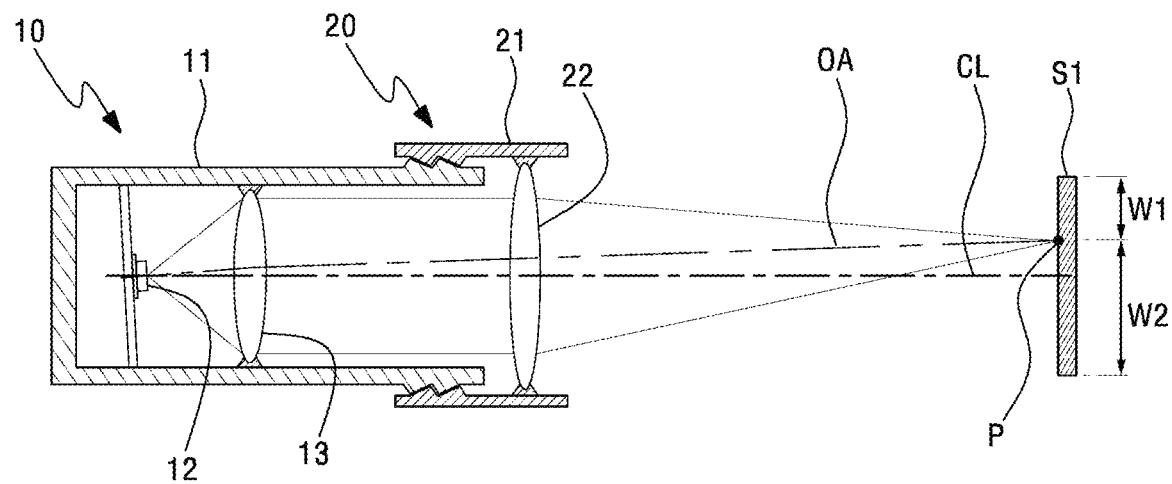
Figure 6:
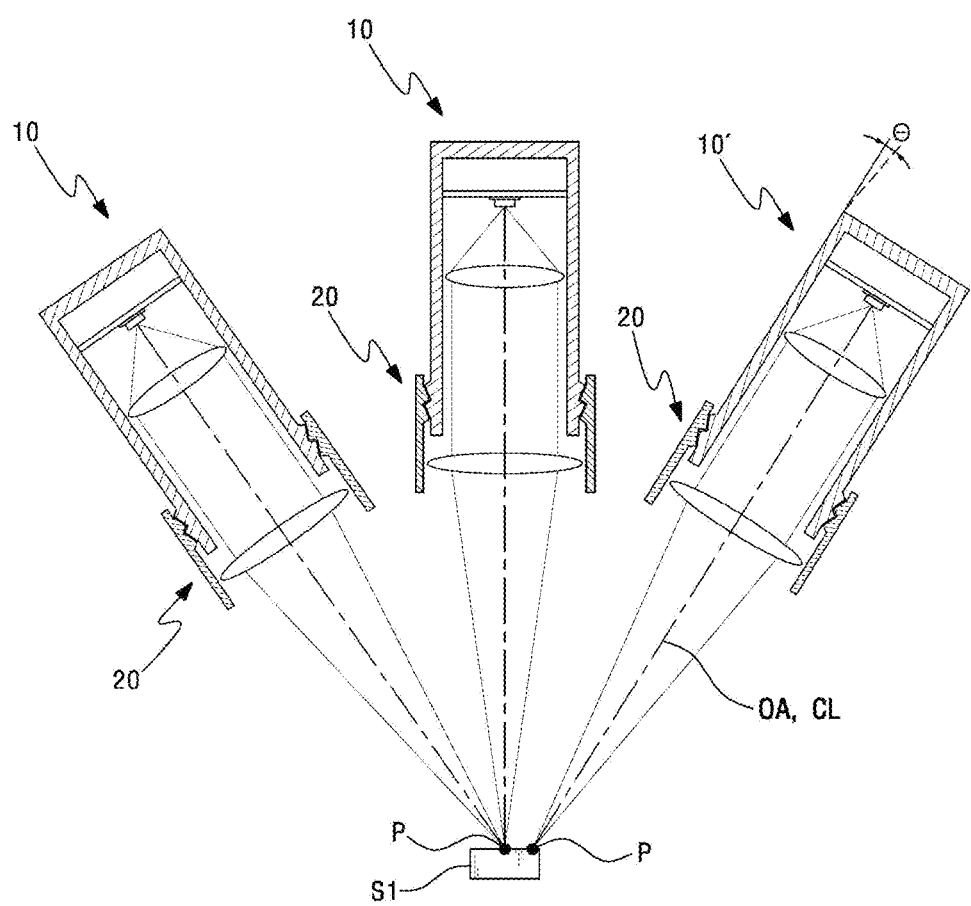
Figure 7:
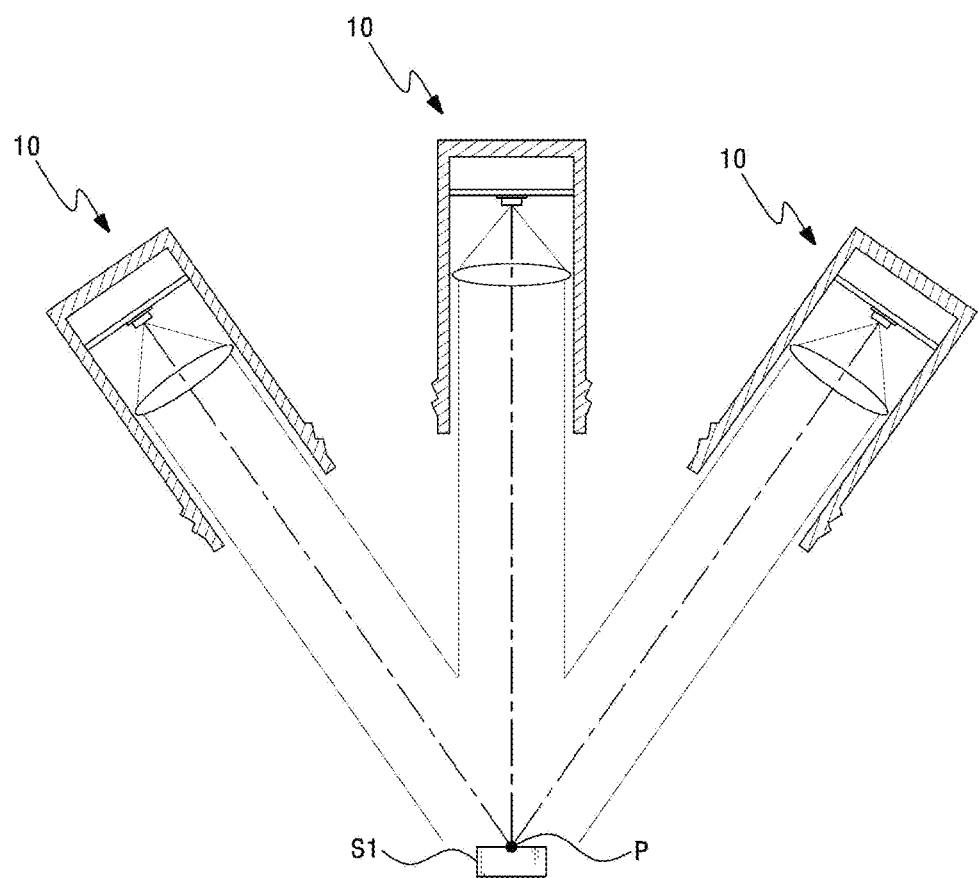
FIG. 7 is a cross-sectional view illustrating a state where an alignment evaluator of the apparatus for inspecting alignment of optical device of the present disclosure has been removed.

Of the drawings attached, FIGS. 5A, 5B, and 6 are views illustrating a state where alignment error has been determined according to the apparatus for inspecting alignment of optical device of the present disclosure, and FIG. 7 is a cross-sectional view illustrating a state where the alignment evaluator 20 of the apparatus for inspecting alignment of optical device of the present disclosure has been removed.

First, as illustrated in FIG. 4, the adapter 21 of the alignment evaluator 20 may be detachably engaged to the front end portion of the housing 11 of the optical device 10.

When the alignment evaluator 20 is disposed on the front end of the optical device 10 as aforementioned, the illumination light converted into a parallel light beam by the collimating lens 13 of the optical device 10 will be converted into a focused light beam by the condensing lens 22 of the alignment evaluator 20, and the illumination light having a focused light beam will be focused on the image sensor S1, and displayed as an illumination light point P of dot form.

That is, since the illumination light provided from the light source 12 of the optical device 10 will go through the collimating lens 13 and condensing lens 22 and will be displayed as the illumination light point P in the form of a dot on the image sensor S1, it is possible to easily check the alignment state of the optical device 10 through the image obtained through the image sensor S1.

More specifically, FIG. 4 illustrates how the light source 12 and the collimating lens 13 disposed inside the optical device 10 are aligned with the central axis CL of the housing 11, and in such a case where the alignment state of the light source 12 and the collimating lens 13 is good, the light may be condensed by the condensing lens 22 and the illumination light point P of a dot form may be displayed on the center of the imaging surface of the image sensor S1.

Further, as in FIG. 5A, when the central axis of the light source 12 disposed inside the optical device 10 does not coincide with the central axis CL of the housing 11, or when the central axis of the collimating lens 13 disposed inside the optical device 10 does not coincide with the central axis CL of the housing as in FIG. 5B, or when the central axis CL of the housing 11 of the optical device 10' does not pass through the central point of the image sensor S1 as in FIG. 6, the optical axis OA of the illumination light will not coincide with the central axis CL of the housing 11. Here, the illumination light point P that is converted into a focused light beam through the condensing lens 22 of the alignment evaluator 20 and displayed in a dot form will be located at a point deviated away from the center on the imaging surface of the image sensor S1, and therefore, it will be easy to grasp the alignment state of the light source 12 of the optical device 10 or the collimating lens 13 and the alignment state of the housing 11 of the optical device 10.

Here, the alignment state of the light source 12 and the collimating lens 13 may be determined by whether an absolute value of a distance value W1 between one side end of the image sensor S1 and the illumination light point P minus a distance value W2 between another side end of the image sensor S and the illumination point P exceeds a predetermined tolerance value, and when the absolute value exceeds the tolerance value, it may be determined as a misalignment, and when the absolute value does not exceed the tolerance value, it may be determined as a good alignment.

Meanwhile, in the case of inspecting the image sensor S1 using a plurality of optical devices 10 disposed in a radial or symmetrical form with respect to the image sensor S1, it will be possible to find the misaligned optical device 10' by lighting up the light source 12 of the plurality of optical devices 10 in a predetermined order.

After checking the alignment state of the optical device 10 using the alignment evaluator 20 as aforementioned, as illustrated in FIG. 7, it is possible to remove the alignment evaluator 20 assembled onto the front end portion of the optical device 10, and then perform a test on the image sensor S1 using the optical device 10.

According to the present embodiment as aforementioned, it is possible to easily determine the alignment state of the optical device 10 for testing the image sensor S1 through the alignment evaluator 20, and the optical device 10 determined as misaligned may be easily aligned by replacing the optical device 10 or by adjusting the position, thereby improving the precision and reliability of inspection that uses the optical device 10.

Next, an apparatus for inspecting alignment of optical device according to a second embodiment of the present disclosure will be described.

Figure 8:
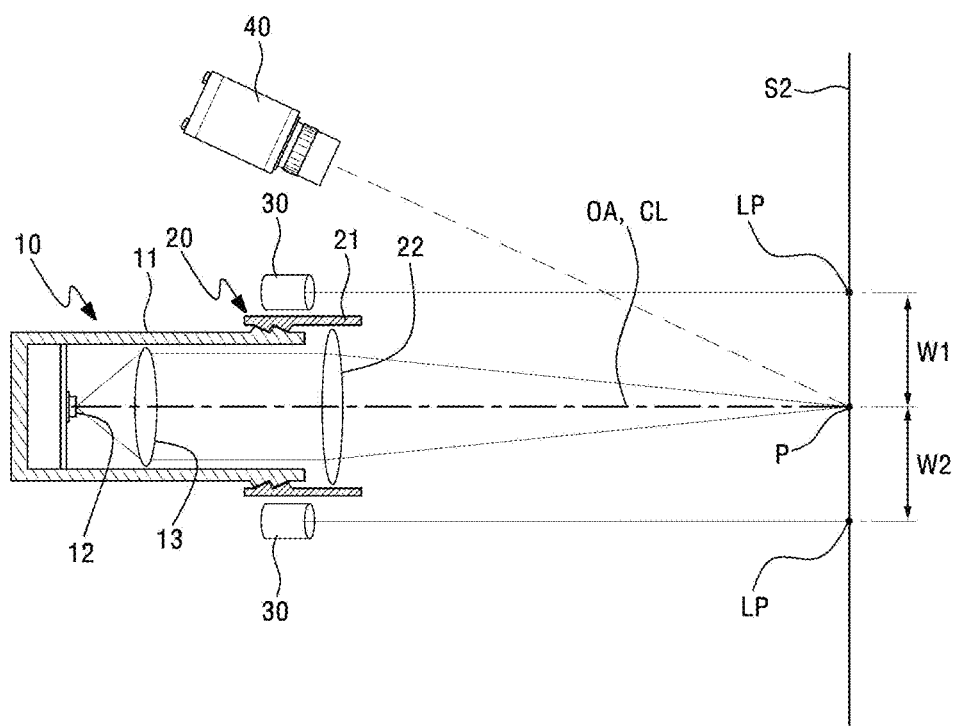
FIG. 8 is a schematic configuration view of an apparatus for inspecting alignment of optical device according to a second embodiment of the present disclosure.

Of the attached drawings, FIG. 8 is a schematic configuration view of the apparatus for inspecting alignment of optical device according to the second embodiment of the present disclosure.

The apparatus for inspecting alignment of optical device according to the second embodiment of the present disclosure is different from the configuration of the aforementioned first embodiment in that the subject surface consists of a screen S2 on which the illumination light of the optical device 10 can be projected, and that it further includes a laser irradiator 30 that may provide a base line for checking the alignment state and an inspection camera 40 that is capable of obtaining an image from the screen S2.

In the aforementioned first embodiment, the subject surface consists of the imaging surface of the image sensor S1, in which case whether the optical device 10 is aligned can only be checked when power is applied to the image sensor S1, that is, by applying power to the image sensor S1, and then transmitting the image obtained from the image sensor S1 to a separate controller through a signal line, etc. Meanwhile, in cases where the subject surface is configured as the screen S2 on which the dot point of the illumination light of the optical device 10 is projected, the alignment state of the optical device 10 can be checked even when it is difficult to apply power to the image sensor S1.

Here, since a base line for comparing the location of the illumination point P is not provided on the screen S2, the laser irradiator 30 may provide a laser point LP for determining whether the optical device 10 is aligned.

The laser irradiator 30 is configured to irradiate a laser light towards the screen S2 in a direction parallel to the central axis CL of the housing 11.

Such a laser irradiator 30 may be assembled on an outer circumference of the adapter 21 of the alignment evaluator 20 such that at least one laser irradiator 30 can rotate around the central axis CL of the housing 11. In this case, by irradiating the laser point LP at a first position that is biased to one side from the central axis CL of the housing 11, it is possible to measure the distance value W1 between the laser point LP at one side and the illumination light point P, and subsequently, by irradiating the laser point LP at a second position that is symmetrical to the first position with respect to the central axis CL of the housing 11, it is possible to measure the distance value W2 between the laser point LP at another side and the illumination light point P.

Here, it is desirable that a virtual segment connecting the first position and the second position is set to pass through the central axis CL of the housing 11 and the illumination light point P.

Meanwhile, the laser irradiator 30 may be disposed at both sides of the adapter 21 to be symmetrical with respect to the central axis CL of the housing 11. Further, it is desirable that the laser irradiator 30 disposed at both sides of the outer circumference of the adapter 21 is configured to rotate with respect to the central axis CL of the housing 11 on the outer circumference of the adapter 21 such that the virtual segment connecting the first position where the one side laser irradiator 30 is disposed and the second position where the other side laser irradiator 30 is disposed passes through the central axis CL of the housing 11 and the illumination light point P.

The scope of rights of the present disclosure is not limited to the aforementioned embodiments but may be implemented as various forms of embodiments within the claims set attached hereto. Any person having ordinary skill in the art to which the present invention pertains without departing from the gist of the present invention as claimed in the claims is deemed to be within the scope of the claims of the present invention to a wide range that can be modified.

REFERENCE NUMERALS

10: OPTICAL DEVICE, 11: HOUSING, CL: CENTRAL AXIS, 12: LIGHT SOURCE, 13: COLLIMATING LENS, OA: OPTICAL AXIS, P: ILLUMINATION LIGHT POINT, 20: ALIGNMENT EVALUATOR, 21: ADAPTER, 22: CONDENSING LENS, 30: LASER IRRADIATOR, LP: LASER POINT, 40: INSPECTION CAMERA, S1: IMAGE SENSOR, S2: SCREEN

The invention claimed is:

1. An apparatus for inspecting alignment of an optical device, comprising:
an optical device used for inspecting an image sensor comprising a housing having an optical path, a light source disposed inside the housing to provide an illumination light for inspection to a subject surface consisting of an imaging surface of the image sensor, and a collimating lens for converting the illumination light irradiated from the light source into a parallel light beam; and
an alignment evaluator that is provided with a condensing lens for converting the parallel light beam into a focused light beam such that a condensed illumination light is displayed as an illumination light point having a dot form on the subject surface, wherein the alignment evaluator is disposed in front of the optical device and is configured to check an alignment state of the light source, the collimating lens and a central axis of the housing of the optical device by determining whether an absolute value of a distance value between one side end of the image sensor and an illumination light point minus a distance value between another side end of the image sensor and the illumination light point exceeds a predetermined tolerance value.

2. The apparatus for inspecting alignment of an optical device according to claim 1,
wherein the alignment evaluator comprises an adaptor that is detachably assembled onto a front end portion of the housing while supporting the condensing lens.

3. The apparatus for inspecting alignment of an optical device according to claim 1,
wherein the optical device is provided in plural, and the alignment evaluator is disposed in front of each of the optical device, and the condensing lens of the alignment evaluator disposed in front of each of a plurality of optical devices is configured to focus on a single point.

* * * * *